R. J. BERRYMAN.
APPARATUS FOR MANUFACTURING ICE.
APPLICATION FILED JAN. 22, 1912.
1,039,018.
Patented Sept. 17, 1912.
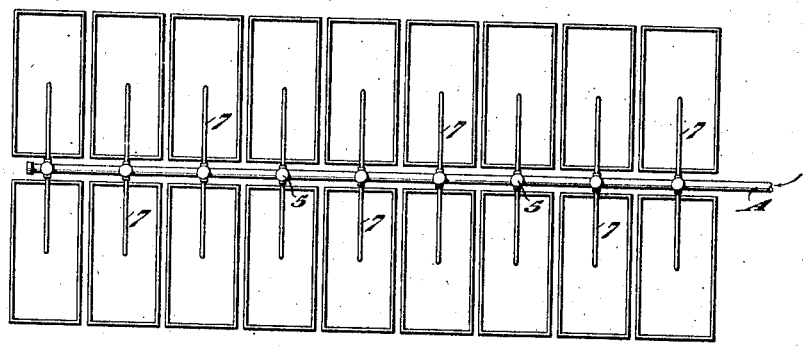
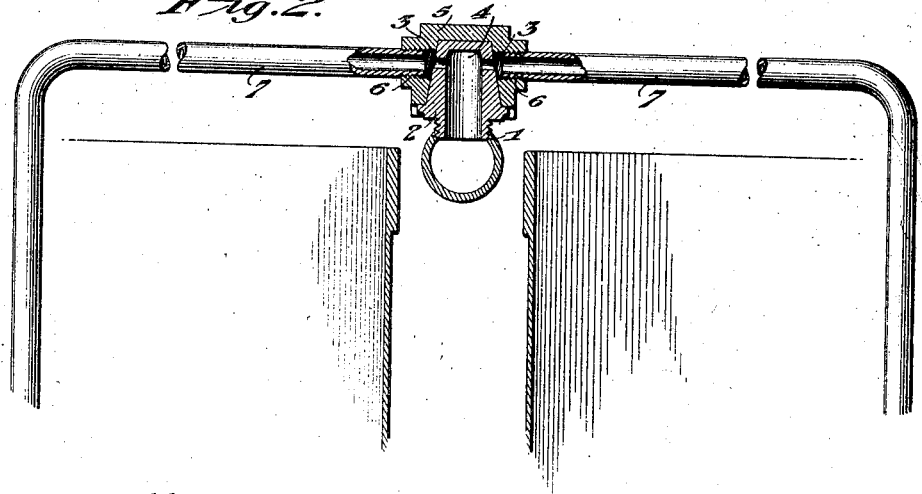
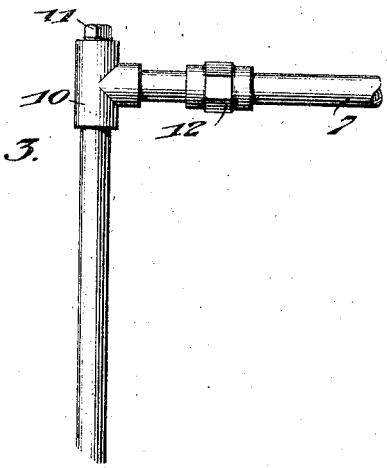
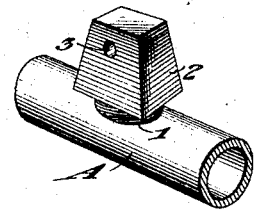

UNITED STATES PATENT OFFICE.

ROBERT J. BERRYMAN, OF ANNAPOLIS, MARYLAND.

APPARATUS FOR MANUFACTURING ICE.

1,039,013.

Specification of Letters Patent. Patented Sept. 17, 1912.

Application filed January 22, 1912. Serial No. 672,676.

*To all whom it may concern:*

Be it known that I, ROBERT J. BERRYMAN, a citizen of the United States, residing at Annapolis, in county of Anne Arundel and State of Maryland, have invented certain new and useful Improvements in Apparatus for Manufacturing Ice, of which the following is a specification.

My invention relates to an improvement in apparatus for manufacturing ice, and more particularly can ice, the present invention being confined to portable mechanism for supplying and discharging air into the water contained in the cans for agitating the same during the freezing process, the object being to distribute the air uniformly into a plurality of cans and so arrange the mechanism that the distributing means may be removed and replaced at any time.

In the accompanying drawings:—Figure 1 is a plan view showing the arrangement of my improved apparatus, Fig. 2 is an enlarged transverse sectional view, Fig. 3 is a modification. Fig. 4 is an enlarged detail in perspective showing plug 2 in the form of a truncated pyramid.

A, represents a main distribution pipe. This pipe is preferably located between two rows of cans, and, at points between the cans, screw-threaded orifices 1, 1, are formed in the upper surface of the pipe. A hollow plug 2 is tapped into each orifice. The outer ends of these plugs are preferably of truncated cone-shape, their outer surfaces being ground smooth; and air jets 3, 3, extend from the bore 4 to the surface in opposite directions. A cap 5 is counterbored to fit the truncated cone of the plug, and oppositely extended screw-threaded holes 6, 6, are formed in this cap, these holes extending through to the bore. L-shaped discharge pipes 7, 7, the upper ends of which are threaded, are screwed into these holes, and their lower ends are open for the discharge of air into the water in the cans, the L-shaped pipes being sufficiently long to reach well into the cans, and the weight and the friction of the device being sufficient to overcome the air pressure, whereby the cap when forced securely upon the can remains seated there so that the air from the pipe A passes out in jets in opposite directions into the discharge pipes 7, 7, into the water for agitating the same during the process of freezing. In this way, the air is uniformly distributed in the desired quantity. When it is desired to remove the device, the main air pipe remains stationary, and it is simply necessary to lift out the cap and nozzles to be replaced when the fresh cans of water are put in place. This avoids the necessity of disturbing the pipe or pipes A which remain stationary, and in a position midway between the rows of cans in which the ice is being or to be formed, so that the removal and replacement of the nozzles is a very simple operation, while at the same time effectual in the performance of the function required.

To provide for the contingency of the discharge pipes 7, 7, becoming frozen solid in the ice, I have a plan of dismembering these pipes as illustrated in Fig. 3, in which they are made in sections. A convenient method of doing this is to employ a T 10 at the angles between the horizontal and the vertical members of the discharge pipes, and to screw plugs 11, 11, into the upper open ends in order to close them, and connect the T's to the horizontal portion of the discharge pipe by means of unions 12, 12. In this way, the intermediate horizontal portion together with the cap may be removed and the vertical portions thawed from the ice at any time, if required.

It might be added that in lieu of air, ozone could be used for both agitating the water and destroying any bacteria.
More or less slight changes might be resorted to in the form and arrangement of the several parts described without departure from the spirit and scope of my invention, and hence I do not wish to be limited to the exact construction herein set forth, but:—

Having fully described my invention, what I claim as new and desire to secure by Letters Patent, is:—

1. In apparatus for manufacturing ice, the combination with a pipe, cone plugs secured therein, and having outwardly-extending orifices which communicate with said pipe, and a cap fitted to the cone and having openings opposite the orifices in the cone, and nozzles at these openings for the discharge and distribution of the air.

2. In apparatus for manufacturing ice, the combination with a main water pipe and hollow-cone-shaped plug secured therein and having orifices extending from the bore to the surface of the plug, of a cap fitted to the cone and provided with openings at points opposite the orifices, and L-shaped nozzles or discharge pipes secured in the openings for the discharge and distribution of the air.

In testimony whereof I affix my signature, in the presence of two witnesses.

ROBERT JAMES BERRYMAN.

Witnesses:
M. E. BOHN,
S. M. M. CORY.